United States Patent
Wortel et al.

(10) Patent No.: US 7,055,047 B2
(45) Date of Patent: May 30, 2006

(54) SELECTIVE IMPLEMENTATION OF POWER MANAGEMENT SCHEMES BASED ON DETECTED COMPUTER OPERATING ENVIRONMENT

(75) Inventors: Klaas Wortel, Phoenix, AZ (US); David K. Lovelace, Chandler, AZ (US); Luis J. Briones, Chandler, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 468 days.

(21) Appl. No.: 10/410,089

(22) Filed: Apr. 9, 2003

(65) Prior Publication Data

US 2004/0205361 A1 Oct. 14, 2004

(51) Int. Cl.
*G06F 1/32* (2006.01)

(52) U.S. Cl. ...................... 713/320; 713/300
(58) Field of Classification Search ............ 713/300, 713/320
See application file for complete search history.

(56) References Cited

U.S. PATENT DOCUMENTS

| | | | |
|---|---|---|---|
| 5,793,359 A | 8/1998 | Ushikubo | |
| 6,026,288 A * | 2/2000 | Bronner | 455/343.2 |
| 6,052,116 A | 4/2000 | Takagi | |
| 6,466,787 B1 * | 10/2002 | Cannon et al. | 455/434 |
| 6,735,448 B1 * | 5/2004 | Krishnamurthy et al. | 455/522 |
| 6,763,483 B1 * | 7/2004 | Penick et al. | 714/39 |
| 6,781,570 B1 * | 8/2004 | Arrigo et al. | 345/158 |
| 6,934,520 B1 * | 8/2005 | Rozsypal | 455/127.3 |

OTHER PUBLICATIONS http://h18066.www1.hp.com/products/quickspecs/11488_na/11488_na.HTML, 3 sheets, date unknown.
www.wireless-computing.com, Wireless Keyboard RF-250, 6 pages, Jun. 12, 2002.

* cited by examiner

*Primary Examiner*—Chun Cao
*Assistant Examiner*—Vincent Tran
(74) *Attorney, Agent, or Firm*—Meyertons Hood Kivlin Kowert & Goetzel, P.C.; Jeffrey C. Hood; Russell E. Henrichs

(57) ABSTRACT

Detecting a radio frequency (RF) environment around a computer and using a power management scheme for an RF user input device being used by the computer system. If the computer system is in a single user environment, a power management scheme may be used to conserve power on the RF user input device. If the computer system is in a multi-user environment, a power management scheme may be used to minimize interference between neighboring computer systems by minimizing the signal strength of the RF signal from the RF user input device and the RF signal from the computer system.

40 Claims, 4 Drawing Sheets

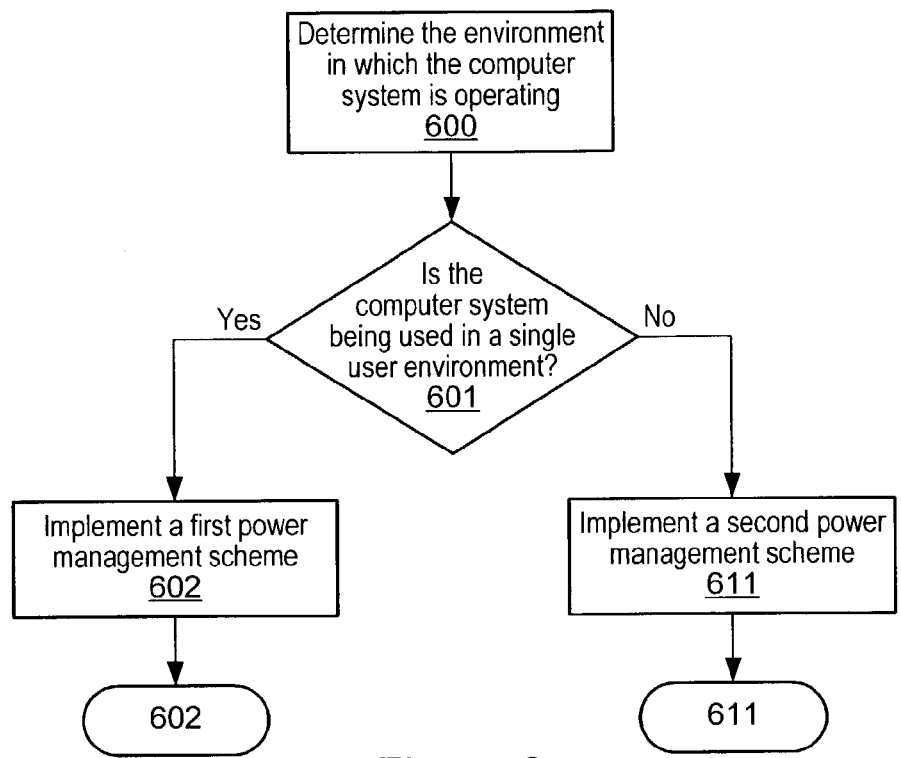
Figure 6
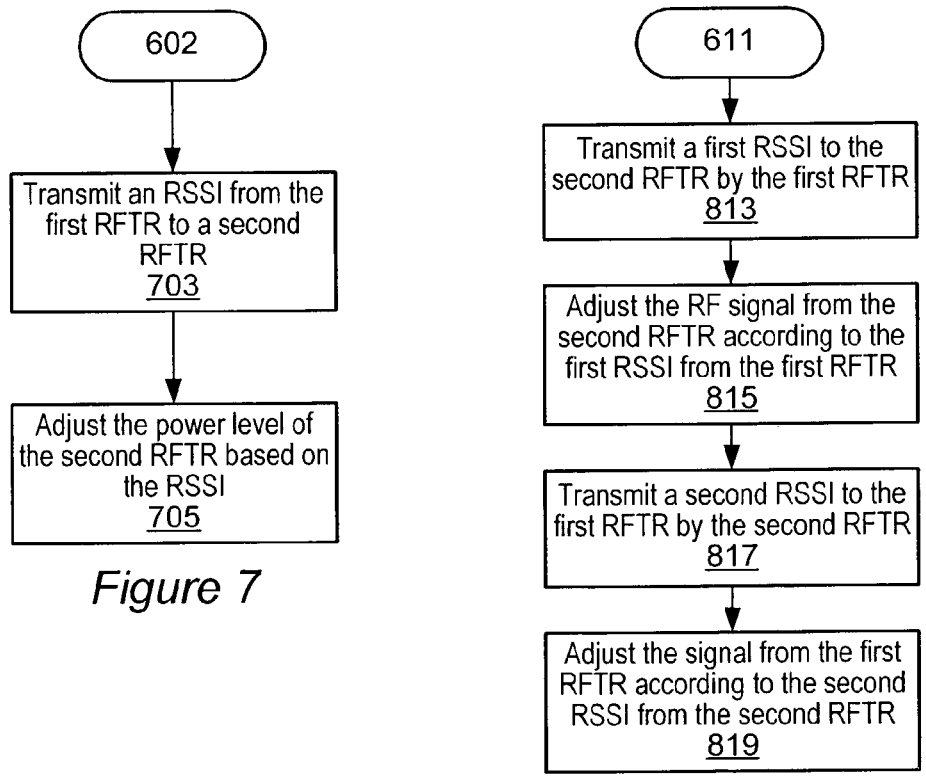
Figure 7
Figure 8

SELECTIVE IMPLEMENTATION OF POWER MANAGEMENT SCHEMES BASED ON DETECTED COMPUTER OPERATING ENVIRONMENT

BACKGROUND OF THE INVENTION

1. Field of the Invention

The present invention relates generally to managing peripheral device usage for a computer and specifically to managing power levels of radio frequency peripheral devices according to a detected environment.

2. Description of the Related Art

Computer systems may use many different types of user input devices. For example, computer systems may receive input from user input devices such as, but not limited to, a computer mouse, a keyboard, a microphone, a camera, a wireless pointing device, and a joystick. Because managing wires from different user input devices may be cumbersome, the computer system may use wireless, e.g., radio frequency (RF), signals to communicate with the user input device. However, user input devices using RF signals may require an independent power source (e.g., a battery) that may weaken over time. In addition, if more than one computer system is used within the range of the RF signal from the computer system and/or the user input device, RF signals from each computer system and/or user input device may overlap and interfere.

For example, if an RF computer mouse for one computer system is used too closely to a second computer system with an RF computer mouse, the RF signals from the RF computer mouse may be received by the second computer system and cause erroneous results on the second computer system. Computer system users may have to stop using RF user input devices when around other RF computer systems, or computer system users may need to space their computer systems enough apart to avoid RF overlap.

SUMMARY OF THE INVENTION

One embodiment of the invention comprises a computer system that implements different power management schemes based on the environment in which the computer system is being used. A computer system using a wireless user input device (e.g., an RF user input device) may determine what type of environment the computer system is being used. For example, the computer system may be used in a single user environment or a multi-user environment. While the invention is described in terms of a user input device, it is to be noted that the invention may also be applied to wireless output devices such as, but not limited to, wireless speakers, wireless monitors, and wireless printers. In one embodiment, the computer system may determine the type of environment the computer system is in by monitoring a number of RF signals being received above a first threshold and within a set frequency range by a first radio frequency transmitter/receiver (RFTR) coupled to the computer system. In one embodiment, the first threshold may be set at a power level above a background noise level and the frequency range may be a range of frequencies typically used for RF user input devices. Other threshold levels and other frequency ranges are also contemplated.

If the computer system is being used in the single user environment (i.e., only one RF signal is being received above the first threshold and within a set frequency range), a first power management scheme may be implemented to conserve battery power in the RF user input device. In one embodiment, the single user environment may include an environment where fewer than a number of available RF channels are being used. For example, the first power management scheme may be implemented if only four RF channels are being used and eight RF channels are available. The first power management scheme may comprise transmitting a received signal strength indicator (RSSI) from the first RFTR (of the computer system) to a second RFTR of the RF user input device. In one embodiment, the first RFTR may be transmitting the RSSI at full power to maximize a usable range of the user input device. The first power management scheme may include adjusting the power level of the second RFTR based on the RSSI from the first RFTR (i.e., the received signal strength of signals generated by the second RFTR). In one embodiment, the second RFTR power level may be adjusted to maintain the power level of the second RFTR to a power level in a range of minimally sufficient power levels to transmit signals to the first RFTR (e.g., minimum power level detectable by the first RFTR plus or minus three decibels). Other power level ranges are also contemplated.

If the computer system is not being used in the single user environment (e.g., is being used in a multi-user environment), a second power management scheme may be implemented to reduce interference with neighboring computer systems. In one embodiment, the multi-user environment may comprise multiple RF signals being detected above the first threshold and within the range of frequencies. Other environments for the second power management scheme are also contemplated.

In one embodiment of the second power management scheme, the first RFTR (of the computer system) may transmit a first RSSI to the second RFTR based on an RF signal received by the first RFTR from the second RFTR. In other words, the computer system may generate an indication of received signal strengths of signals generated by the user input device. The RF signal from the second RFTR may be adjusted according to the first RSSI from the first RFTR to maintain a power level minimally sufficient for the first RFTR to detect. In one embodiment, the minimally sufficient power level may include a power level barely detectable by the first RFTR plus a safety threshold plus or minus 3 decibels. The safety threshold may insure that the RF user input device is not moved out of range before the RF user input device receives another RSSI from the first RFTR and adjusts the RF signal from the second RFTR accordingly. Other minimally sufficient power levels are also contemplated.

In one embodiment of the second power management scheme, a second RSSI may be transmitted by the second RFTR to the first RFTR. The RF signal from the first RFTR may be adjusted according to the RSSI from the second RFTR. In one embodiment, the RF signals from the first RFTR and the second RFTR may be adjusted according to the RSSI received by the respective first RFTR and second RFTR to minimize the interference from the RF signals from the first RFTR and the second RFTR to neighboring computer systems. In one embodiment, neighboring computer systems may use different RF frequencies to allow a greater amount of interference from the RF signals than if the neighboring computer systems were using one RF frequency.

BRIEF DESCRIPTION OF THE DRAWINGS

A better understanding of the present invention may be obtained when the following detailed description is considered in conjunction with the following drawings, in which:

FIG. 6 is a flowchart of a method for implementing a first power management scheme or a second power management scheme, according to one embodiment;

FIG. 7 is a flowchart of a method for managing the first power management scheme, according to one embodiment; and FIG. 8 is a flowchart of a method for managing the second power management scheme, according to one embodiment.

Figure 1:
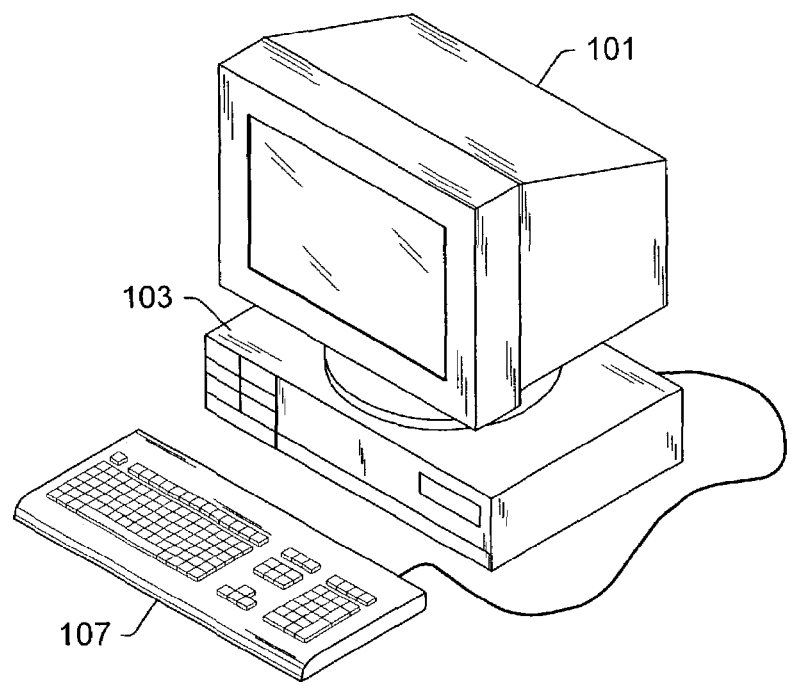
FIG. 1 illustrates a computer system with an RF user input device, according to one embodiment.
Figure 1:
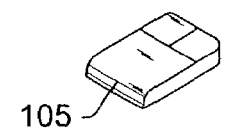

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1: Computer System with RF Computer Mouse

FIG. 1 illustrates an embodiment of a computer system with a wireless user input device (e.g., an RF user input device), such as, but not limited to, an RF computer mouse. In one embodiment, the computer system may detect an environment the computer system is in (e.g., a single user environment or a multi-user environment) and then implement a corresponding power management scheme. For example, if the computer system detects the single user environment, the computer system and the RF user input device may coordinate to minimize the power level of the RF user input device to conserve battery power in the RF user input device. In another example, if the computer system detects the multi-user environment, the computer system and the RF user input device may coordinate to minimize an interference range of RF signals the computer system and the RF user input device use to communicate with. Minimizing the interference range may allow more computer systems with RF user input devices to operate near each other. Other environments and power management schemes are also contemplated.

In various embodiments, the RF user input device may include, but is not limited to, a computer mouse, a keyboard, a microphone, a monitor, a speaker, a camera, a light pen, a wireless pointing device, and a joystick. Other user input devices are also contemplated. Embodiments of the user input devices described herein may also be used with wireless output devices, such as wireless speakers, wireless monitors, and wireless printers.

Figure 2:
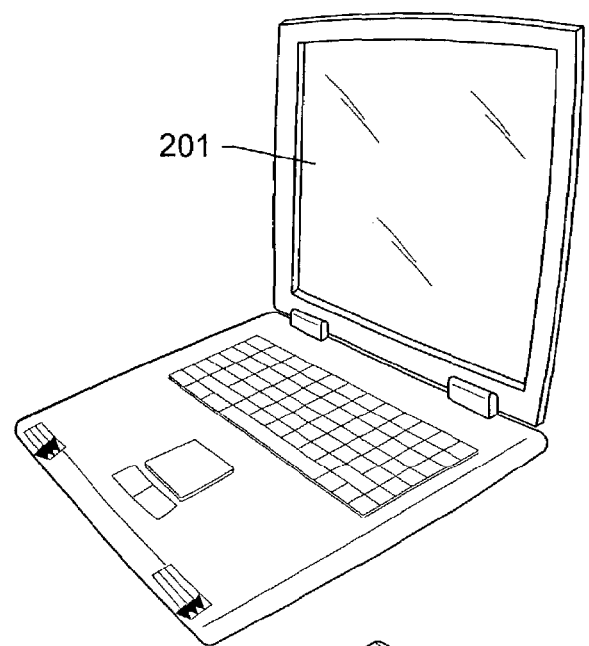
FIG. 2 illustrates a laptop with an RF computer mouse, according to one embodiment.
Figure 2:
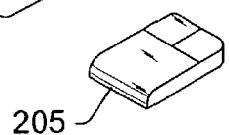

FIG. 2: Laptop with RF Computer Mouse

FIG. 2 illustrates an embodiment of a computer system such as, but not limited to a laptop 201, with an RF user input device 205 (e.g., an RF computer mouse). The laptop 201 may be used in single user environments or multi-user environments. In one embodiment, the laptop may detect the type of environment in which the laptop 201 is operating and implement an appropriate power management scheme.

Figure 3:
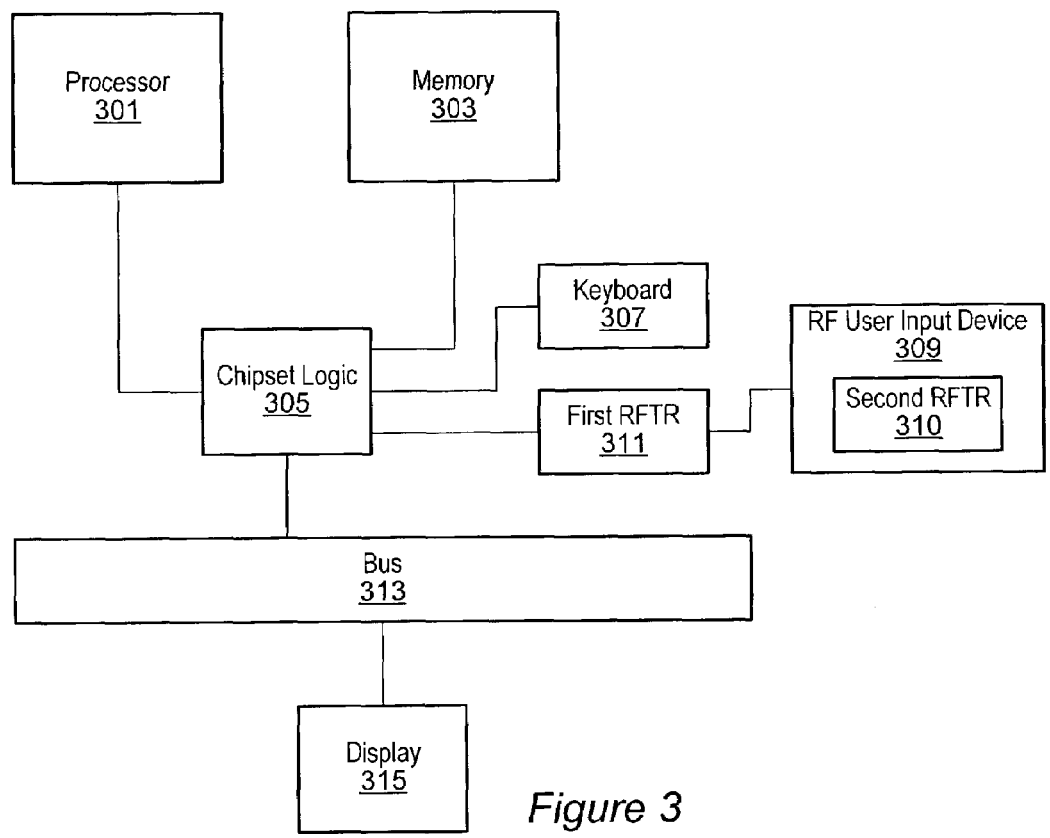
FIG. 3 illustrates a block diagram of a computer system, according to one embodiment.

FIG. 3: Computer System Block Diagram

FIG. 3 is a block diagram of an embodiment of a computer system. In one embodiment, the computer system may include a processor 301, a memory 303, a chipset logic 305, a keyboard 307, an RF user input device 309, a bus 313, and a display 315. In one embodiment, the chipset logic 305 may not be used. In one embodiment, the computer system may have a first RFTR to send/receive RF signals to/from an RF user input device. In one embodiment, the RF user input device may use a second RFTR to communicate with the first RFTR in a wireless fashion. In one embodiment, the first RFTR and the second RFTR may use wireless antennae to send RF signals back and forth. For example, the first RFTR and the second RFTR may use omni-directional antennae. In one embodiment, a power amplifier in the first RFTR and a power amplifier in the second RFTR may be sensitive to power levels in three decibel increments. Other RFTR antennae and sensitivities are also contemplated. Other components are also contemplated.

Figure 4:
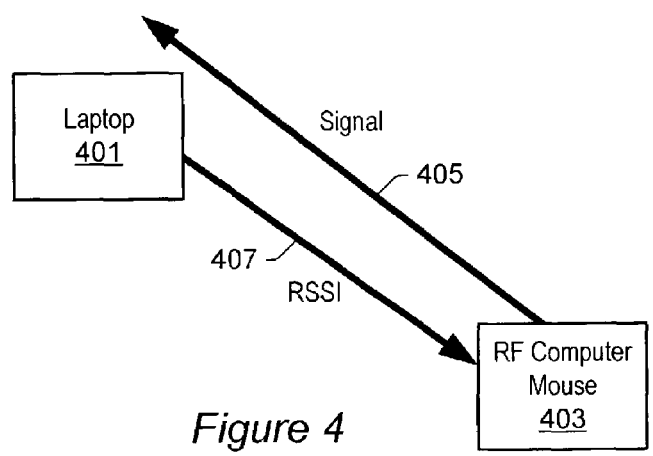
FIG. 4 illustrates a first environment including a single user, according to one embodiment.

FIG. 4: Single User Environment

FIG. 4 illustrates an embodiment of a first environment having a single user. In one embodiment, the laptop 401 may determine that the laptop 401 is being used in a single user environment and implement a first power management scheme. For example, the laptop 401 may send an RSSI 407 to an RF user input device 403. The RF user input device 403 may adjust its RF signal 405 according to the RSSI 407. In one embodiment, the first power management scheme may be designed to maximize battery life of an RF user input device 403.

Figure 5:
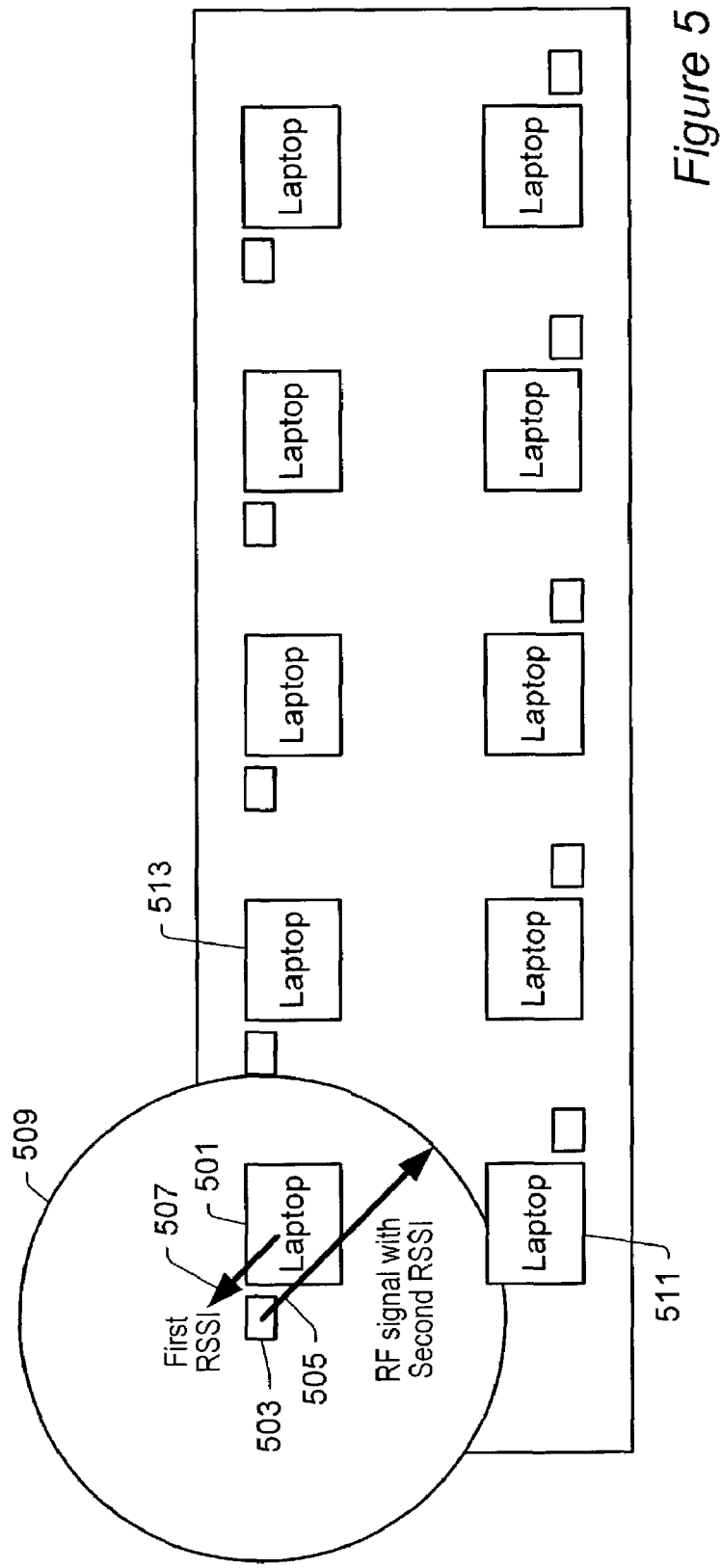
FIG. 5 illustrates a second environment including multiple users, according to one embodiment.

FIG. 5: Multi-user Environment

FIG. 5 illustrates an embodiment of a second environment such as, but not limited to, a multi-user environment. In one embodiment, if the laptop 501 determines that the laptop 501 is being used in the multi-user environment, the laptop 501 may implement a second power management scheme. In one embodiment, the laptop 501 may send a first RSSI 507 to the RF user input device 503 that may in return send an RF signal and a second RSSI 505 to the laptop 501. In one embodiment, both the laptop 501 and the RF user input device 503 may adjust their RF signal strengths to minimize an interference range 509 while keeping the laptop 501 and RF user input device 503 in contact. The larger the interference range 509 is, the more neighboring laptops the signals (including the first and second RSSI) may interfere with (e.g., laptop 511 and 513).

FIG. 6: Flowchart for Implementing the First and Second Power Management Schemes FIG. 6 is a flowchart of an embodiment of a method for implementing a first power management scheme or a second power management scheme. It should be noted that in various embodiments of the methods described below, one or more of the steps described may be performed concurrently, in a different order than shown, or may be omitted entirely. Other additional steps may also be performed as desired.

At 600, the computer system may determine the environment in which the computer system is operating. For example, the computer system may detect what type of environment the computer system is operating in by monitoring any RF signals being received by the first RFTR above a first threshold and within a set frequency range. In one embodiment, the first threshold may be set at a power level above a background noise level and the frequency range may be set to a range of frequencies typically used by RF user input devices. Other threshold levels and other frequency ranges are also contemplated. Other ways of detecting the type of environment may also be contemplated. For example, a user may input in which type of environment the computer system is operating.

At 601, the computer system may determine if the computer system and the RF user input device are being used in a single user environment. For example, the computer system may determine the computer system is operating in a single user environment if the computer system is receiving only one RF signal above the first threshold and with the set frequency range. In one embodiment, the single user environment may include an environment where fewer than a number of available RF channels are being used. For example, the first power management scheme may be implemented if only four RF channels are being used and eight RF channels are available. Other single user environments are also contemplated.

At 602, if the computer system is being used in a single user environment, a first power management scheme may be implemented. In one embodiment, the first power management scheme may be implemented if only one RF signal above the first threshold and within the range of frequencies is detected. In one embodiment, the first power management scheme may be implemented if multiple RF signals are detected, but each is at a frequency different from the other RF signals being detected. Other reasons for implementing the first power management scheme are also contemplated.

At 611, if the computer system is not being used in a single user environment, the second power management scheme may be implemented. For example, a multi-user environment may comprise multiple RF signals being detected above the first threshold and within the range of frequencies. Other reasons for using the second power management scheme are also contemplated.

FIG. 7: Flowchart for Managing the First Power Management Scheme

FIG. 7 is a flowchart of an embodiment of a method for managing a first power management scheme. It should be noted that in various embodiments of the methods described below, one or more of the steps described may be performed concurrently, in a different order than shown, or may be omitted entirely. Other additional steps may also be performed as desired.

Continuing from 602 in FIG. 6, at 703, the first power management scheme may comprise transmitting an RSSI from the first RFTR to the second RFTR. In one embodiment, the RSSI may be based on the power level of the RF signal received by the first RFTR from the second RFTR. As the second RFTR receives the RSSI, the second RFTR may increase the second RFTR power level or decrease the second RFTR power level to keep the power level the second RFTR operates at between the range of minimally sufficient power levels. For example, if the RSSI from the first RFTR indicates that the RF signal from the second RFTR is becoming too weak (e.g., the RF user input device is moving away from the computer system), the second RFTR may respond by increasing the RF signal strength (originating from the second RFTR). In another example, if the RSSI indicates that the RF signal from the second RFTR may be adjusted downward, the second RFTR may respond by decreasing the RF signal strength.

Operating at a range of minimally sufficient power levels may allow the RF user input device to conserve power. In one embodiment, the first RFTR may be in the computer system and may be transmitting the RSSI at full power such that the second RFTR will be able to detect the RSSI from the first RFTR throughout the range of the first RFTR. Other power levels besides the full power level may also be used by the first RFTR. In one embodiment, the second RFTR may be in an RF user input device, such as, but not limited to, an RF computer mouse. In one embodiment, the first power scheme may include allowing the RF user input device to enter a sleep mode (e.g., a low power state) when the computer system or the RF user input device detects that the RF user input device is not being used.

At 705, the first power management scheme may comprise adjusting the power level of the second RFTR based on the RSSI. In one embodiment, the second RFTR power level may be adjusted to maintain the power level of the second RFTR to a power level in a range of minimally sufficient power levels (i.e., minimum power level detectable by the first RFTR plus or minus three decibels). Other power level ranges are also contemplated.

FIG. 8: Flowchart for Managing the Second Power Management Scheme

FIG. 8 is a flowchart of an embodiment of a method for managing the second power management scheme. It should be noted that in various embodiments of the methods described below, one or more of the steps described may be performed concurrently, in a different order than shown, or may be omitted entirely. Other additional steps may also be performed as desired.

Continuing from 611 in FIG. 6, at 813, the first RFTR may transmit the first RSSI to the second RFTR in response to the power level of the RF signal received from the second RFTR. The first RFTR may be coupled to the computer system and the second RFTR may be coupled to the RF user input device.

At 815, the RF signal from the second RFTR may be adjusted according to the RSSI from the first RFTR. In one embodiment, the second RFTR may adjust the RF signal according to the RSSI from the first RFTR to be in a range of minimally sufficient power levels for the first RFTR to detect. In one embodiment, the range of minimally sufficient power levels may include a power level barely detectable by the first RFTR plus a safety threshold plus or minus three decibels. The safety threshold may insure that the RF user input device is not moved out of range before the RF user input device receives another first RSSI from the first RFTR and adjusts the RF signal from the second RFTR accordingly. Other minimally sufficient power levels are also contemplated.

In one embodiment, the safety threshold may be equal to a power level sufficient to prevent the RF user input device from moving out of range too quickly. For example, if the RF user input device is moved to a point where it cannot detect the first RSSI, the RF user input device may be programmed to assume that the computer system has entered a low power state. In one embodiment, the safety threshold may insure that the second RFTR is not moved out of the first RFTR's RSSI range before the next RSSI signal can be sent from the first RFTR. In other words, the safety threshold may prevent the RF user input device from losing contact with the computer system. In one embodiment, the safety threshold may not be used (i.e., the safety threshold may be set to zero). Operating at a range of minimally sufficient power levels may decrease the interference range of the second RFTR's RF signal affecting nearby computer systems.

At 817, a second RSSI may be transmitted by the second RFTR to the first RFTR. In one embodiment, the first RSSI from the first RFTR and the second RSSI from the second RFTR may be based on the strength of the received RF signal from the other RFTR. For example, the second RSSI from the second RFTR may be indicative of the strength of the RF signal (e.g., the first RSSI) from the first RFTR. Other RSSI signals are also contemplated.

At 819, the RF signal from the first RFTR may be adjusted according to the second RSSI from the second RFTR. In one embodiment, the RF signals from the first RFTR and the second RFTR may be adjusted according to the RSSI received by the respective first RFTR and second RFTR to minimize the interference from the RF signals from the first RFTR and the second RFTR to neighboring computer systems. In one embodiment, neighboring computer systems may use different RF frequencies to allow a greater amount of interference from neighboring RF signals than if the neighboring computer systems were using only one RF frequency.

In one embodiment, the second power management scheme may include not allowing the RF user input device to enter a sleep mode (e.g., a low power state) when the computer system or the RF user input device detects that the RF user input device is not being used. The RF user input device may need to remain at a normal power mode to insure a regular exchange of RSSIs with the computer system. In one embodiment, if the second RFTR moves out of range of the first RSSI, the RF user input device may be programmed to assume that the computer system has entered a low power state. To insure that the first RFTR and the second RFTR remain in contact, the computer system and RF user input device may be programmed to expect a regular exchange of RSSIs. In one embodiment, if the second RFTR stops receiving the first RSSI from the first RFTR (e.g., the second RFTR moves out of range of the first RSSI signal), the RF user input device may be programmed to send out the second RSSI at a higher power level and wait for a response. The second RSSI may be sent out at a higher and higher power level until the first RFTR detects the second RSSI and responds with a first RSSI detectable by the second RFTR. In one embodiment, if the first RFTR stops receiving the second RSSI, the first RFTR may send out higher and higher power levels of the first RSSI until the first RFTR receives the second RSSI.

Various embodiments may further include receiving or storing instructions and/or information implemented in accordance with the foregoing description upon a carrier medium. Suitable carrier media may include storage media or memory media such as magnetic or optical media, e.g., disk or CD-ROM, random access memory or other memory, as well as transmission media or RF signals such as electrical, electromagnetic, or digital RF signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer system, comprising:
a processor;
a first radio frequency transmitter/receiver (RFTR);
a user input device comprising a second RFTR, wherein the first RFTR and the second RFTR are operable to communicate in a wireless fashion;
a memory coupled to the processor and configured to store program instructions executable to:
determine if the computer system is being used in a single user environment or a multi-user environment;
wherein the program instructions are executable to implement a first power management scheme for the user input device if the computer system is being used in the single user environment; and
wherein the program instructions are executable to implement a second power management scheme for the user input device if the computer system is being used in the multi-user environment.

2. The computer system of claim 1,
wherein the program instructions are executable to determine if the computer system is being used in the single user environment or the multi-user environment by monitoring a number of radio frequency (RF) signals being received by the first RFTR above a first threshold and within a set frequency range.

3. The computer system of claim 1,
wherein the first power management scheme comprises managing the user input device to operate at a power level in a range of minimally sufficient power levels to transmit an RF signal from the second RFTR at a power level receivable by the first RFTR.

4. The computer system of claim 3,
wherein the first power management scheme includes the first RFTR transmitting a received RF signal strength indication (RSSI) to the second RFTR, wherein the RSSI is based on RF signals transmitted from the second RFTR to the first RFTR;
wherein the first power management scheme includes the user input device adjusting the power level of the second RFTR based on the RSSI.

5. The computer system of claim 4,
wherein the first power management scheme includes the user input device adjusting the power level of the second RFTR based on the RSSI to maintain the power level in a range of minimally sufficient power levels to transmit the RF signal from the second RFTR at a power level receivable by the first RFTR.

6. The computer system of claim 1,
wherein the second power management scheme comprises managing the user input device to operate at a power level in a range of minimally sufficient power levels to transmit the RF signal from the second RFTR at a power level receivable by the first RFTR.

7. The computer system of claim 6,
wherein the second power management scheme includes the first RFTR transmitting a first RSSI to the second RFTR, and the second RFTR adjusting the RF signal from the second RFTR according to the first RSSI to maintain the power level in a range of minimally suffient power levels to transmit the RF signal from the second RFTR at a power level receivable by first RFTR.

8. The computer system of claim 7,
wherein the second power management scheme includes the second RFTR transmitting a second RSSI to the first RFTR and the first RFTR adjusting the RF signal from the first RFTR according to the second RSSI to maintain the power level in a range of minimally suffient power levels to transmit the RF signal from the first RFTR at a power level receivable by second RFTR.

9. The computer system of claim 6,
wherein the second power management scheme includes the second RFTR transmitting at a power level above a safety threshold.

10. The computer system of claim 1, further comprising:
a chipset logic coupled to the processor.

11. The computer system of claim 1,
wherein the user input device is one or more of a computer mouse, a keyboard, a microphone, a camera, a wireless pointing device, and a joystick.

12. The computer system of claim 1,
wherein the first power management scheme includes placing the user input device in an inactive status after a predetermined amount of time of non-use.

13. The computer system of claim 1,
wherein the second power management scheme includes not placing the user input device in an inactive status after a predetermined amount of time of non-use.

14. The computer system of claim 1,
wherein the first RFTR and the second RFTR have omni-directional antennae.

15. The computer system of claim 1,
wherein the first power management scheme includes transmitting the RSSI by the first RFTR at full power.

16. The computer system of claim 1,
wherein the first RFTR and/or the second RFTR are sensitive to three decibel steps in received RF signal strength.

17. A computer system, comprising:
a processor;
a first radio frequency transmitter/receiver (RFTR);
a user input device comprising a second RFTR, wherein the first RFTR and the second RFTR are operable to communicate in a wireless fashion;
a memory coupled to the processor and configured to store program instructions executable to:
determine an environment in which the computer system is being used;
wherein the program instructions are executable to implement a first power management scheme for the user input device if the computer system is being used in a first environment; and
wherein the program instructions are executable to implement a second power management scheme for the user input device if the computer system is being used in a second environment.

18. The computer system of claim 17,
wherein a first environment is defined as the first RFTR receiving only one RF signal from above a first threshold and within a set frequency range.

19. The computer system of claim 18,
wherein the first power management scheme for the user input device puts the user input device in an inactive status after a predetermined amount of time of non-use.

20. The computer system of claim 17,
wherein the second power management scheme keeps the user input device active if the user input device is not used after a predetermined amount of time.

21. The computer system of claim 17,
wherein the first RFTR and the second RFTR have omni-directional antennae.

22. The computer system of claim 17,
wherein the first power management scheme includes the first RFTR transmitting the RSSI at full power.

23. The computer system of claim 17,
wherein the first RFTR and/or the second RFTR are sensitive to three decibel steps in received RF signal strength.

24. The computer system of claim 17,
wherein the user input device is one or more of a computer mouse, a keyboard, a microphone, a camera, a wireless pointing device, and a joystick.

25. A method, comprising:
determining if a computer system is being used in a single user environment or a multi-user environment, wherein said determining is performed based on monitoring of wireless signals;
implementing a first power management scheme for a user input device if the computer system is being used in a single user environment; and
implementing a second power management scheme for the user input device if the computer system is being used in a multi-user environment.

26. The method of claim 25,
wherein determining if the computer system is being used in the single user environment or the multi-user environment includes monitoring a number of RF signals being received above a first threshold and within a set frequency range by a first RFTR coupled to a computer system.

27. The method of claim 25,
wherein the first power management scheme comprises managing the user input device to operate at a power level in a range of minimally sufficient power levels to transmit an RF signal from a second RFTR at a power level receivable by the first RFTR.

28. The method of claim 27,
wherein implementing the first power management scheme comprises:
transmitting an RSSI from the first RFTR to the second RFTR, wherein the RSSI is based on RF signals transmitted from the second RFTR to the first RFTR;
adjusting the power level of the second RFTR by the user input device based on the RSSI.

29. The method of claim 28,
wherein adjusting the power level of the second RFTR by the user input device based on the RSSI includes maintaining the power level in a range of minimally sufficient power levels to transmit an RF signal from the second RFTR at a power level receivable by the first RFTR.

30. The method of claim 25,
wherein the second power management scheme includes managing the user input device to operate at a power level in a range of minimally sufficient power levels to transmit an RF signal from the second RFTR at a power level receivable by the first RFTR.

31. The method of claim 30,
wherein implementing the second power management scheme comprises:
   transmitting a second RSSI to the second RFTR by the first RFTR, and
   adjusting the RF signal from the second RFTR according to the second RSSI to maintain the power level in a range of minimally sufficient power levels to transmit the RF signal from the second RFTR at a power level receivable by the first RFTR.

32. The method of claim 31,
wherein the second power management scheme includes:
   transmitting an RSSI to the first RFTR by the second RFTR, and
   adjusting the RF signal from the first RFTR according to the RSSI to maintain the power level in a range of minimally sufficient power levels to transmit the RF signal from the first RFTR at a power level receivable by the second RFTR.

33. A computer accessible memory medium comprising program instructions, wherein the program instruction are executable by a processor to:
   determining if a computer system is being used in a single user environment or a multi-user environment, wherein said determining is performed based on monitoring of wireless signals;
   implementing a first power management scheme for a user input device if the computer system is being used in a single user environment; and
   implementing a second power management scheme for the user input device if the computer system is being used in a multi-user environment.

34. The memory medium of claim 33,
wherein determining if the computer system is being used in the single user environment or the multi-user environment includes monitoring a number of RF signals being received above a first threshold and within a set frequency range by a first RFTR coupled to a computer system.

35. The memory medium of claim 33,
wherein the first power management scheme comprises managing the user input device to operate at a power level in a range of minimally sufficient power levels to transmit an RF signal from a second RFTR at a power level receivable by the first RFTR.

36. The memory medium of claim 33,
wherein implementing the first power management scheme comprises:
   transmit an RSSI from the first RFTR to the second RFTR, wherein the RSSI is based on RF signals transmitted from the second RFTR to the first RFTR;
   adjust the power level of the second RFTR by the user input device based on the RSSI.

37. The memory medium of claim 36,
wherein adjusting the power level of the second RFTR by the user input device based on the RSSI includes maintaining the power level in a range of minimally sufficient power levels to transmit an RF signal from the second RFTR at a power level receivable by the first RFTR.

38. The memory medium of claim 33,
wherein the second power management scheme includes managing the user input device to operate at a power level in a range of minimally sufficient power levels to transmit an RF signal from the second RFTR at a power level receivable by the first RFTR.

39. The memory medium of claim 38,
wherein implementing the second power management scheme comprises:
   transmitting a first RSSI to the second RFTR by the first RFTR, and
   adjusting the RF signal from the second RFTR according to the first RSSI to maintain the power level in a range of minimally sufficient power levels to transmit the RF signal from the second RFTR at a power level receivable by the first RFTR.

40. The memory medium of claim 39,
wherein implementing the second power management scheme comprises:
   transmitting a second RSSI to the first RFTR by the second RFTR, and
   adjusting the RF signal from the first RFTR according to the second RSSI to maintain the power level in a range of minimally sufficient power levels to transmit the RF signal from the first RFTR at a power level receivable by the second RFTR.

* * * * *

UNITED STATES PATENT AND TRADEMARK OFFICE
CERTIFICATE OF CORRECTION

PATENT NO. : 7,055,047 B2  Page 1 of 1
APPLICATION NO. : 10/410089
DATED : May 30, 2006
INVENTOR(S) : Wortel et al.

It is certified that error appears in the above-identified patent and that said Letters Patent is hereby corrected as shown below:

Column 9
Lines 6-7, please delete "range of minimally suffient power levels" and substitute
-- range of minimally sufficient power levels --.

Column 9
Lines 15-16, please delete "range of minimally suffient power levels" and substitute
-- range of minimally sufficient power levels --.

Column 11
Line 29, please delete "determining if a computer system is being" and substitute
-- determine if a computer system is being --.

Column 11
Line 33, please delete "implementing a first power management scheme" and substitute
-- implement a first power management scheme --.

Column 11
Line 36, please delete "implementing a second power management scheme" and substitute -- implement a second power management scheme --.

Signed and Sealed this

Fourteenth Day of November, 2006

JON W. DUDAS
*Director of the United States Patent and Trademark Office*